April 26, 1949.  E. T. CARLSON  2,468,614
POWER DISTRIBUTION APPARATUS
Filed Feb. 12, 1945  3 Sheets-Sheet 1
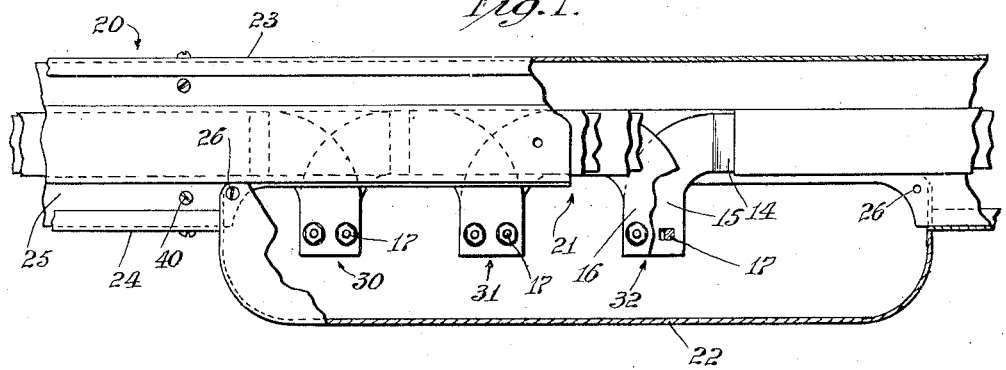
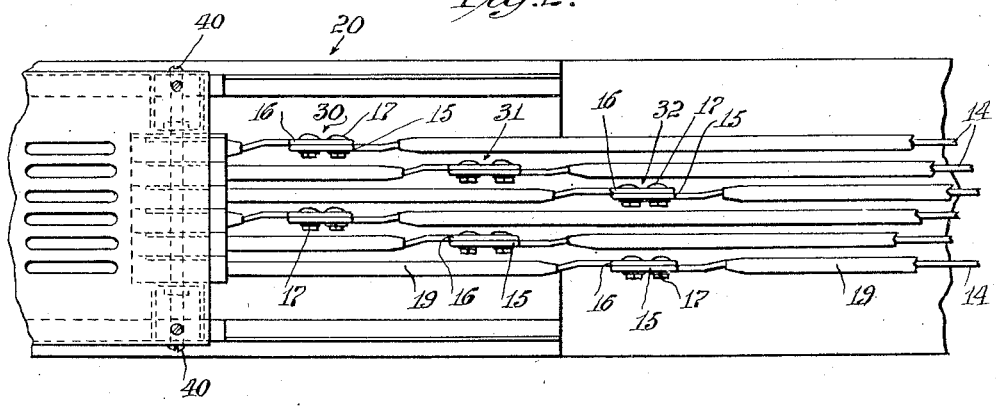
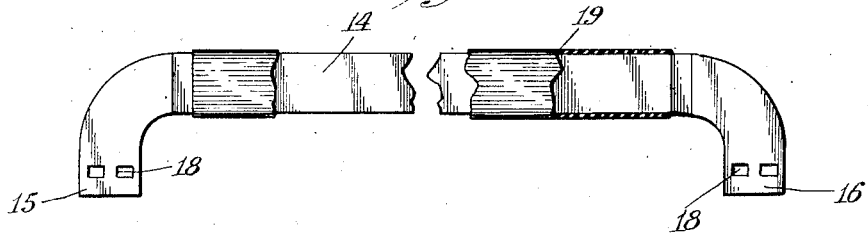
INVENTOR
Elmer T. Carlson
BY
ATTORNEY April 26, 1949.  E. T. CARLSON  2,468,614
POWER DISTRIBUTION APPARATUS
Filed Feb. 12, 1945  3 Sheets-Sheet 2
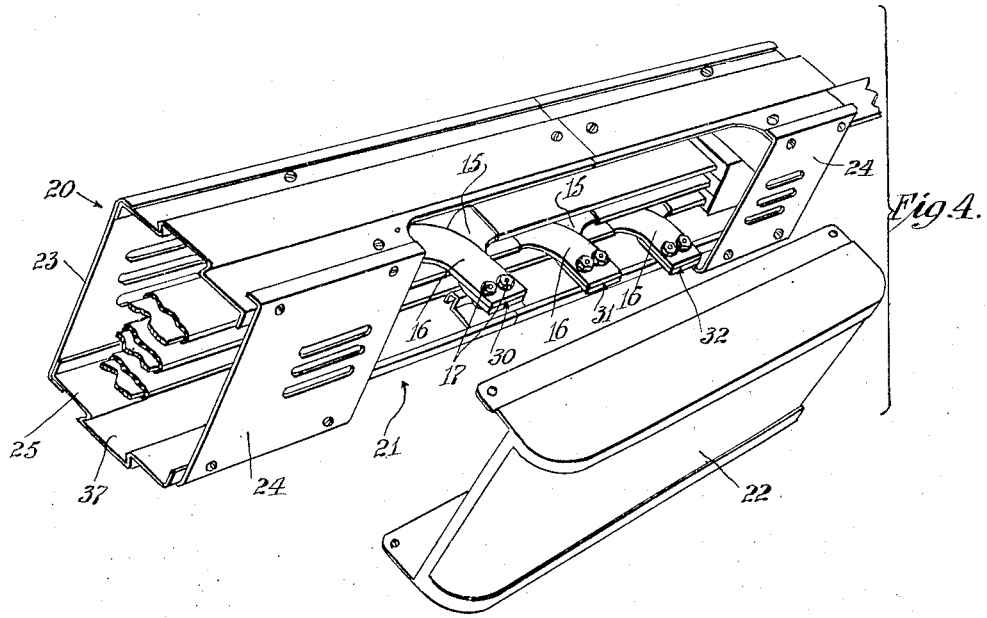
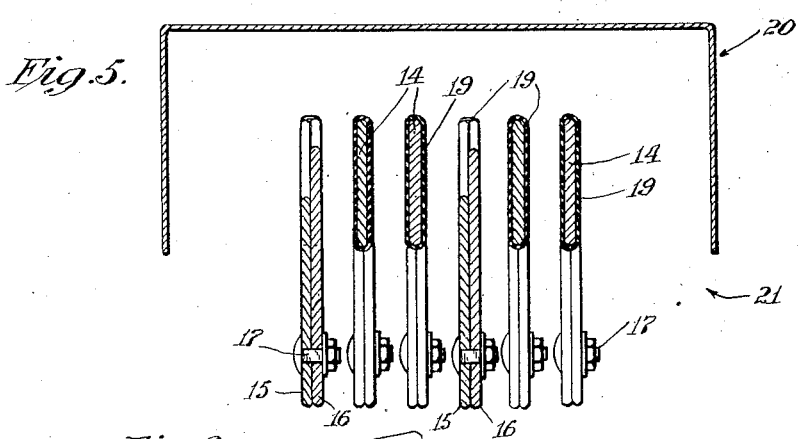
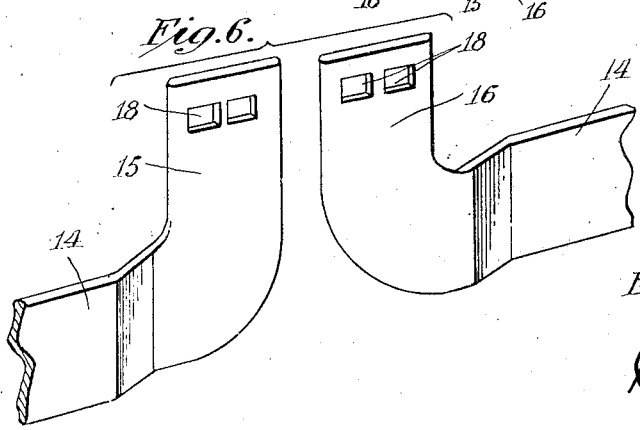
INVENTOR
Elmer T. Carlson
BY
ATTORNEY April 26, 1949.　　　E. T. CARLSON　　　2,468,614
POWER DISTRIBUTION APPARATUS
Filed Feb. 12, 1945　　　3 Sheets-Sheet 3
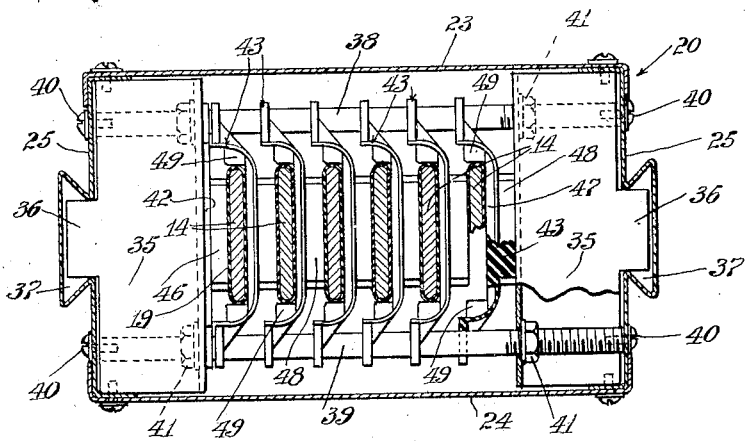
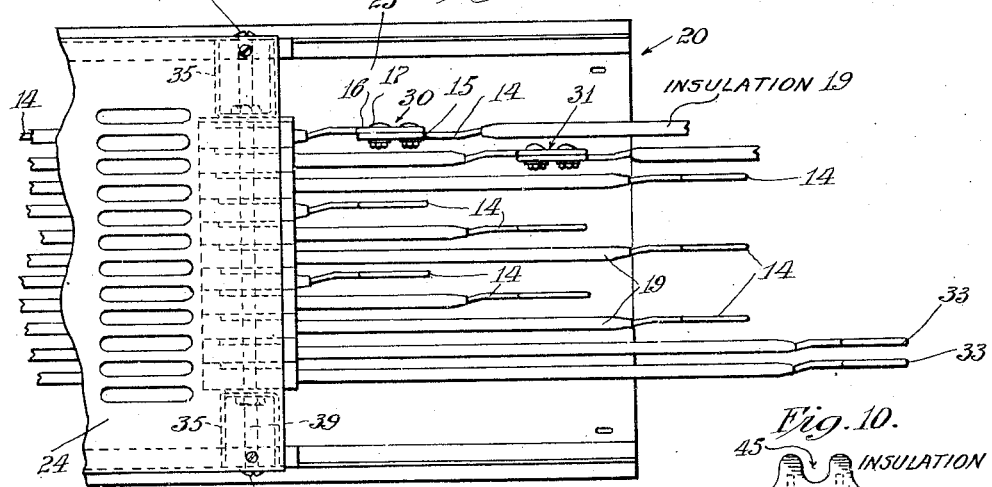
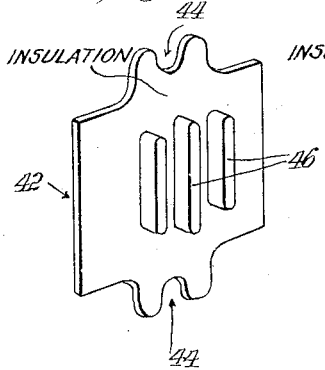
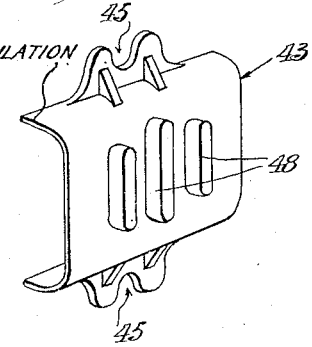
INVENTOR
Elmer T. Carlson
BY
ATTORNEY Patented Apr. 26, 1949

2,468,614

UNITED STATES PATENT OFFICE 2,468,614

POWER DISTRIBUTION APPARATUS

Elmer T. Carlson, Wyoming, Ohio, assignor to The Trumbull Electric Manufacturing Company, Plainville, Conn., a corporation of Connecticut Application February 12, 1945, Serial No. 577,500

4 Claims. (Cl. 174—99)

My invention relates particularly to bus duct systems.

It is customary in such systems to make up each conductor of flat bus bar sections of suitable lengths with the ends of successive sections connected together. To make a satisfactory system it is highly desirable that the construction be compact and that each point be easily effected, inspected and tested. It is desirable to have ample work space around the joints without unduly increasing the spacing needed between adjacent bus bars. From the standpoint of overall performance, the most satisfactory joint in a single conductor has been found to be a simple overlapping of the ends of successive sections of the bus bars and a connection effected by a bolt or bolts passing through the overlapped ends to hold them together. Unfortunately this requires that the spacing between adjacent conductors be kept fairly wide to provide adequate working space and for proper electrical clearance.

Various forms of special fittings or connectors can be and have been used such as in Anderson Patent 2,218,016 but none meet the fullest requirements of the art. Many expedients have been tried but none are as satisfactory as the bolted type joint.

I have discovered a simple solution. Flat sectioned bus bars are arranged side by side in a group in a duct. The ends of the successive bus bar sections are bolted together but instead of being mounted in alinement the ends are bent edgewise from the general plane of the group of bus bars and project from the duct. The joined ends of the various conductors are staggered with respect to each other and covered when in use by a dome-like cover. Details of the preferred construction are shown in the accompanying drawings and described in the following specification.

Fig. 1 is a side view and partial section showing the junction between two bus bar and duct sections with a junction cover in place.

Fig. 2 is a view looking upward at the parts of Fig. 1, the cover being omitted.

Fig. 3 is a side view of the ends of a single bus bar, showing its insulating material in section.

Fig. 4 is a perspective view of the parts of Fig. 1, the cover being shown separately.

Fig. 5 is a cross sectional view of six bus bars and a conventional type of housing on a larger scale showing how the bus bar joints are exposed laterally when the cover is removed.

Fig. 6 is a perspective view of the ends of two separated bus bars.

Fig. 7 is a cross sectional view of one form of bus duct system showing one method of supporting the bus bars, parts being broken away.

Figs. 8 and 9 are perspective views of two of the insulating supports or spacers of Fig. 7.

Fig. 10 is a view of the spacer collar of Fig. 9 taken from the side opposite that shown in Fig. 9.

Fig. 11 is a view showing one end of a duct section with nine phase bus bars and two neutrals.

Each conductor of the system is made up of a succession of flat bus bars 14 having their ends 15 and 16 bent edgewise from the general plane of the bars. These ends are also preferably bent laterally slightly so that the main lengths are in alinement and adjacent overlapping ends are secured together by bolts 17. Preferably the shanks of the bolts are square in cross section so that they will not turn in the rectangular holes 18. The main length of each bus bar section is preferably wrapped or otherwise coated with insulation 19.

Such a system requires a suitable number of conductors arranged side by side in a group or bank and is enclosed in a housing or duct 20 usually made up of a number of sections corresponding in length to the length of the bus bars. At the location of the joints between the bus bar sections, the duct is cut away at 21 so as to leave the bus bar junctions exposed laterally when the cover 22 is removed. The particular construction of the duct is not material to the instant invention. As shown the duct consists of upper and lower walls 23, 24 and sides 25, 25 all suitably connected. The cover 22 is connected at 26, 26 to the side walls.

Where there are parallel conductors the joints 30, 31, 32 are arranged in staggered relation as shown in Figs. 1, 2, and 4. In Fig. 11 is shown a system with nine phase conductors and two neutrals 33, 33.

In Fig. 7 is shown a system embodying six conductors supported in the duct by channel-like posts 35, 35 arranged at intervals in the duct and having projecting lugs 36, 36 positioned in the channels 37, 37 in the side walls. Transverse rods 38, 39 are supported in these posts and secured to the side walls by screws 40, 40. Nuts 41, 41 are adjustable on these rods 38, 39 for drawing the posts toward each other and compressing the bus bar collars or spacers together. These spacers 42 and 43 are formed of insulating material and have open grooves or notches 44 and 45 through which the rods 38, 39 extend. The spacer 42 has ribs 46 which engage the adjacent bus bar. The spacers 43 have ribs 47 and 48 on opposite sides for contacting the bus bars on opposite sides. The right hand spacer 43 engages the post 35 on its right. Each of the spacers 43 has lugs 49 at top and bottom for engaging and positioning a bus bar.

By such a construction the bus bars are adequately supported as compactly as is mechanically and electrically feasible.

For access to the bus bar joints, the cover 22 is removed—whereupon the joints are fully exposed and may be readily inspected.

By reason of the edgewise bending of the bars, the joints actually extend from the general plane of the group of bars and run cooler than straight over-lap joints. This is so because the joints can radiate heat free from the influence of adjacent bus bars.

The bus bars are wrapped or coated throughout the straight part of their length with insulation and this, together with the staggering of the joints, permits a very close spacing of the bus bars for minimum dimensions and low voltage drop. Furthermore the bus bars are supported in such manner as to maintain proper relation to each other and to the walls of the duct. Close spacing is also important from purely mechanical and economical standpoints since it is thus possible to house the bars in the smallest practical duct.

The means for supporting the bus bars as shown in Figs. 7 to 11, inclusive, is shown and claimed in my application Serial No. 68,638 filed December 31, 1948.

It will be seen that the respective flat bus bar sections of the various conductors of the group are arranged side by side with their upper and lower edges in parallel planes except at the ends of the respective sections and that the ends are offset or bent edgewise beyond one plane so as to permit the ends to be bolted together beyond or outside of this plane which plane may be regarded as the general plane of the group.

I claim:

1. In a bus bar system of distribution, a group of flat bus bar conductors arranged side by side and each made up of connected sections, the connections of the different sections being arranged in staggered relation and offset from the general plane of the group of bus bars whereby all the connections are exposed and accessible from the sides independently of each other.

2. A bus bar system of distribution comprising a plurality of sectioned strip bus bars, means supporting said bus bars in parallel closely spaced flatwise relation with respect to each other with their edges on at least one side substantially in a predetermined common plane, said bus bars each consisting of a plurality of sections arranged in substantial alinement with adjacent end portions bent edgewise from said plane so as to project from between adjacent bus bars for increased heat dissipation and said end projecting portions being in overlapped relation, a bolt extending through said projecting end portions for clamping said end portions together in good electrical contact with each other, and electrically insulating material surrounding said bus bars except for said projecting end portions, the spacing between said bus bars being so close as to prevent free insertion or removal of said bolt if said overlapping end portions and said bolt were positioned between adjacent bus bars, and the projecting ends of adjacent bus bars being in staggered relation.

3. In an electric power distribution system a plurality of conductors, each of said conductors comprising a plurality of successive bus bar lengths of greater width than thickness, said conductors being arranged in closely spaced side by side relation to form a group of conductors each of said bus bar lengths having ends extending outwardly beyond the general plane of said group of conductors, means connecting the adjacent ends of said successive bus bar lengths together, said means connecting adjacent ends of said successive bus bar lengths of adjacent conductors being arranged in staggered relation.

4. In a bus bar system of electric power distribution the combination of a plurality of flat conductors arranged side by side in a group, each conductor consisting of successive sections of flat bus bars, the bus bars of adjacent conductors of the group being arranged side by side with the edges of the bus bars of the group lying in parallel planes, the ends of the bus bar sections of each conductor extending outwardly from one of said planes and the adjacent ends of said sections overlapping, means for connecting together the adjacent overlapping ends of bus bar sections of each conductor in a plane outside of said latter plane, the connecting means for the respective bus bar sections being arranged in staggered relation and means for insulating the respective bus bar sections between their ends.

ELMER T. CARLSON.

REFERENCES CITED

The following references are of record in the file of this patent:

UNITED STATES PATENTS

| Number | Name | Date |
|---|---|---|
| 404,877 | Tailleur | June 11, 1889 |
| 918,845 | Goldschmidt | Apr. 20, 1909 |
| 1,203,177 | Bostick | Oct. 31, 1916 |
| 1,691,422 | Aalborg | Nov. 13, 1928 |
| 2,006,931 | Powers | July 2, 1935 |
| 2,059,986 | Frank | Nov. 3, 1936 |
| 2,071,713 | Terrill | Feb. 23, 1937 |
| 2,097,324 | Hill | Oct. 26, 1937 |
| 2,191,645 | DeMask | Feb. 27, 1940 |
| 2,356,006 | Samer | Aug. 15, 1944 |